(12) United States Patent
Stowell et al.

(10) Patent No.: US 10,802,920 B2
(45) Date of Patent: Oct. 13, 2020

(54) BACKUP AND RESTORE VALIDATION

(71) Applicant: Pivotal Software, Inc., San Francisco, CA (US)

(72) Inventors: Therese Louise Stowell, London (GB); Jatin Naik, London (GB); Chunyi Lyu, London (GB); Giuseppe Capizzi, London (GB); Edward Eliot Cook, London (GB); Rosemary Bloxsom, London (GB)

(73) Assignee: Pivotal Software, Inc., San Francisco, CA (US)

( * ) Notice: Subject to any disclaimer, the term of this patent is extended or adjusted under 35 U.S.C. 154(b) by 164 days.

(21) Appl. No.: 15/956,538

(22) Filed: Apr. 18, 2018

(65) Prior Publication Data

US 2019/0324861 A1    Oct. 24, 2019

(51) Int. Cl.
*G06F 11/00*    (2006.01)
*G06F 11/14*    (2006.01)
*G06F 9/455*    (2018.01)
*H04L 29/06*    (2006.01)
*H04L 29/08*    (2006.01)

(52) U.S. Cl.
CPC ...... *G06F 11/1448* (2013.01); *G06F 9/45558* (2013.01); *G06F 11/1464* (2013.01); *G06F 11/1469* (2013.01); *H04L 63/12* (2013.01); *G06F 2009/45562* (2013.01); *H04L 67/1097* (2013.01)

(58) Field of Classification Search
CPC ............. G06F 11/1469; G06F 11/1448; G06F 11/1458; G06F 3/065; G06F 11/1438
See application file for complete search history.

(56) References Cited

U.S. PATENT DOCUMENTS 7,299,376 B2    11/2007   Kodi et al.
7,529,834 B1    5/2009    Birrell et al.
(Continued)

OTHER PUBLICATIONS

International Search Report & Written Opinion in International Application No. PCT/US2019/027861, dated Aug. 1, 2019, 20 pages.
(Continued)

*Primary Examiner* — Loan L. T. Truong
(74) *Attorney, Agent, or Firm* — Fish & Richardson P.C.

(57) ABSTRACT

Methods, systems, and apparatus, including computer programs encoded on computer storage media, for receiving a request to generate a backup of a distributed computing system; generating, by each of the plurality of components of the distributed computing system, one or more backup artifacts; generating, by each of the plurality of components of the distributed computing system, verification data, the verification data being metadata about the contents of the generated backup artifacts; obtaining a second request to validate the backup; provisioning a restore environment; processing the plurality of backup artifacts to restore the plurality of components in the provisioned restore environment; performing a verification process using respective verification data for the restored component, wherein each verification process determines whether contents of the restored component matches the respective verification data for the restored component; and outputting a result of the verification process.

20 Claims, 4 Drawing Sheets

(56) References Cited

U.S. PATENT DOCUMENTS

| | | | |
|---|---|---|---|
| 7,657,796 B1 | 2/2010 | Kaiser et al. | |
| 8,914,329 B1* | 12/2014 | Chandra | G06F 11/263 |
| | | | 707/654 |
| 10,474,548 B2* | 11/2019 | Sanakkayala | G06F 11/301 |
| 10,652,313 B2* | 5/2020 | Chen | H04L 67/10 |
| 2005/0015415 A1* | 1/2005 | Garimella | G06F 3/0623 |
| 2005/0223043 A1 | 10/2005 | Randal et al. | |
| 2007/0186127 A1 | 8/2007 | Desai et al. | |
| 2007/0214196 A1* | 9/2007 | Garimella | G06F 11/1464 |
| 2008/0072002 A1* | 3/2008 | Kuwahara | G06F 11/1456 |
| | | | 711/162 |
| 2008/0209142 A1* | 8/2008 | Obernuefemann | |
| | | | G06F 11/1456 |
| | | | 711/161 |
| 2009/0193102 A1* | 7/2009 | Trujillo | G06F 11/1469 |
| | | | 709/220 |
| 2010/0318812 A1* | 12/2010 | Auradkar | G06F 11/1464 |
| | | | 713/193 |
| 2011/0202734 A1* | 8/2011 | Dhakras | G06F 9/45533 |
| | | | 711/162 |
| 2012/0084262 A1* | 4/2012 | Dwarampudi | G06F 9/442 |
| | | | 707/667 |
| 2012/0084523 A1* | 4/2012 | Littlefield | G06F 11/1469 |
| | | | 711/162 |
| 2012/0117422 A1 | 5/2012 | Radhakrishnan | |
| 2013/0080841 A1* | 3/2013 | Reddy | G06F 11/3495 |
| | | | 714/47.3 |
| 2013/0085999 A1* | 4/2013 | Tung | G06F 11/1451 |
| | | | 707/654 |
| 2013/0124807 A1* | 5/2013 | Nielsen | G06F 11/1438 |
| | | | 711/162 |
| 2013/0173780 A1* | 7/2013 | Ditto | G06F 9/5011 |
| | | | 709/224 |
| 2013/0232463 A1* | 9/2013 | Nagaraja | G06F 8/61 |
| | | | 717/101 |
| 2013/0326279 A1* | 12/2013 | Chavda | G06F 11/3672 |
| | | | 714/41 |
| 2014/0189432 A1* | 7/2014 | Gokhale | G06F 11/1464 |
| | | | 714/41 |
| 2014/0250319 A1* | 9/2014 | Rieschl | G06F 11/2028 |
| | | | 714/4.11 |
| 2014/0289203 A1* | 9/2014 | Chan | H04L 65/1069 |
| | | | 707/652 |
| 2015/0207875 A1* | 7/2015 | Avati | H04L 67/1095 |
| | | | 709/203 |
| 2015/0347430 A1* | 12/2015 | Ghosh | G06F 11/1451 |
| | | | 707/649 |
| 2015/0378758 A1* | 12/2015 | Duggan | G06F 9/4881 |
| | | | 714/15 |
| 2015/0381711 A1* | 12/2015 | Singh | H04L 41/0816 |
| | | | 709/221 |
| 2016/0085829 A1* | 3/2016 | Jin | G06F 11/1458 |
| | | | 707/718 |
| 2016/0132684 A1* | 5/2016 | Barbas | G06F 11/1448 |
| | | | 713/165 |
| 2016/0170844 A1* | 6/2016 | Long | G06F 16/21 |
| | | | 707/679 |
| 2016/0217042 A1* | 7/2016 | Wang | G06F 16/27 |
| 2016/0253351 A1* | 9/2016 | Hansen | G06F 11/1453 |
| | | | 707/692 |
| 2017/0046247 A1* | 2/2017 | Nutter | G06Q 10/063 |
| 2017/0123939 A1* | 5/2017 | Maheshwari | H04L 67/2842 |
| 2017/0192854 A1* | 7/2017 | Vartanov | G06F 11/1451 |
| 2017/0262217 A1* | 9/2017 | Pradhan | H04L 67/32 |
| 2018/0081666 A1* | 3/2018 | Surdu | G06F 8/65 |
| 2018/0300203 A1* | 10/2018 | Kathpal | G06F 16/278 |
| 2018/0322019 A1* | 11/2018 | Stowell | G06F 9/4843 |
| 2019/0020716 A1* | 1/2019 | Fukuchi | G06F 11/2025 |
| 2019/0243719 A1* | 8/2019 | Yadav | G06F 9/45558 |
| 2019/0268403 A1* | 8/2019 | Anderson | H04L 41/145 |
| 2019/0370148 A1* | 12/2019 | Du | G06F 11/3664 |

OTHER PUBLICATIONS

"Getting Started with Small Footprint PAS," [online] [Retrieved on Apr. 18, 2018]; Retrieved from the Internet URL: http://docs.pivotal.io/pivotalcf/2-0/customizing/small-footprint.html, 6 pages.

"Spike: backup artifact validation," [online] [Retrieved on Apr. 18, 2018]; Retrieved from the Internet URL: https://www.pivotaltracker.com/n/projects/1662777/stories/153698438, 1 page.

Cloudfoundry.org [online], "Bosh Backup and Restore," Clound Foundry Documentation, [retrieved on Mar. 13, 2019], retrieved from: https://docs.cloudfoundry.org/bbr/, 4 pages.

Hui, "Disaster Recovery in the Cloud with Rubrik, Part 2: The Architectures," Rubrik, dated Sep. 26, 2017, 7 pages.

Oracle.com [online], "Database Backup and Recovery User's Guide," Oracle Help Center, [retrieved on Mar. 13, 2019], retrieved from: https://docs.oracle.com/cd/B28359_01/backup.111/b28270/rcmvalid.htm#BRADV90063, 11 pages.

* cited by examiner

BACKUP AND RESTORE VALIDATION

BACKGROUND

This specification relates to validating backup data for a distributed computing system having various operational components that each performs a specialized function within the system.

A distributed computing system having multiple operational components can execute in a first distributed computing environment. For example, the first distributed computing environment can be a cloud computing platform system having one or more provisioned underlying physical computing resources to implement each respective operational component of the distributed computing system.

A distributed computing system can perform a backup process by directing each operational component of the system to store on disk all data that would be necessary and sufficient to recreate the component in a second computing environment. For example, each component can store a serialized version of all data currently maintained by the component. In this specification, backup data stored in nonvolatile memory will be referred to as being stored in backup artifacts. Such backup processes are typically performed periodically, e.g., once every day or once every week.

A restore process can then recreate the distributed computing system with all of its operational components in a second computing environment. To do so, the restore process can provision the underlying physical computing resources in the second computing environment and read the backup artifacts in order to restore the data maintained by each of the operational components of the system.

Operators of such distributed computing systems want to know if the backup artifacts are being generated correctly. In other words, it is highly desirable to know whether or not the backup artifacts being generated are actually sufficient to recreate the distributed computing system in a second computing environment should a catastrophic failure occur, e.g., due to a power outage or a natural disaster.

However, testing restore processes are expensive and risky, particularly if the original computing environment is still up and running. Provisioning an entirely duplicated second computing environment consumes significant additional computing resources for distributed computing systems of substantial size. And if the operator of the distributed computing system is paying for resources in a cloud computing environment, provisioning an entirely duplicated second system can double the spend rate just for the purposes of testing the restore process.

In addition, it can be hard to predict how restored components in the restored environment might interfere with or compete with components in the original environment. For example, if an original component consumes data from a queue, its restored component may also try to consume data from the same queue. This kind of interference can damage the stability of the original system, just for testing the restore process.

As a result, it is expensive and risky to determine whether or not a proper backup is being generated by the backup processes.

SUMMARY

This specification describes a technology that allows a distributed computing system to validate backup data generated by operational components of a distributed computing system by using metadata stored within the backup artifacts themselves. Each of the operational components generates metadata that describes properties of what a fully restored version of the component should look like. Then, the restore process can run verification processes that use the metadata in the backup artifacts to validate whether or not the backup artifacts are being generated correctly.

Particular embodiments of the subject matter described in this specification can be implemented to realize one or more advantages. The technology allows backup artifacts that are being generated to be validated in a way that is computationally cheaper than performing a full restore and which is still sufficiently reliable for large distributed computing systems. Because the restore process can use the metadata in the backup artifacts, the restore process does not need to provision an entirely duplicated restore environment and can instead use a light-weight computing environment for the backup validation, which saves computational resources and their associated costs. Therefore, the system can validate the backup data without performing a full restore. The restore process is safer because the backup artifacts can be validated without provisioning operational components in the restore process that interfere with the original components. In addition, the backup and restore framework is more flexible because the verification scripts can be customized for each of the different operational components of the distributed computing system. The verification processes can also be easily integrated with existing backup scripts supported by the distributed computing system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
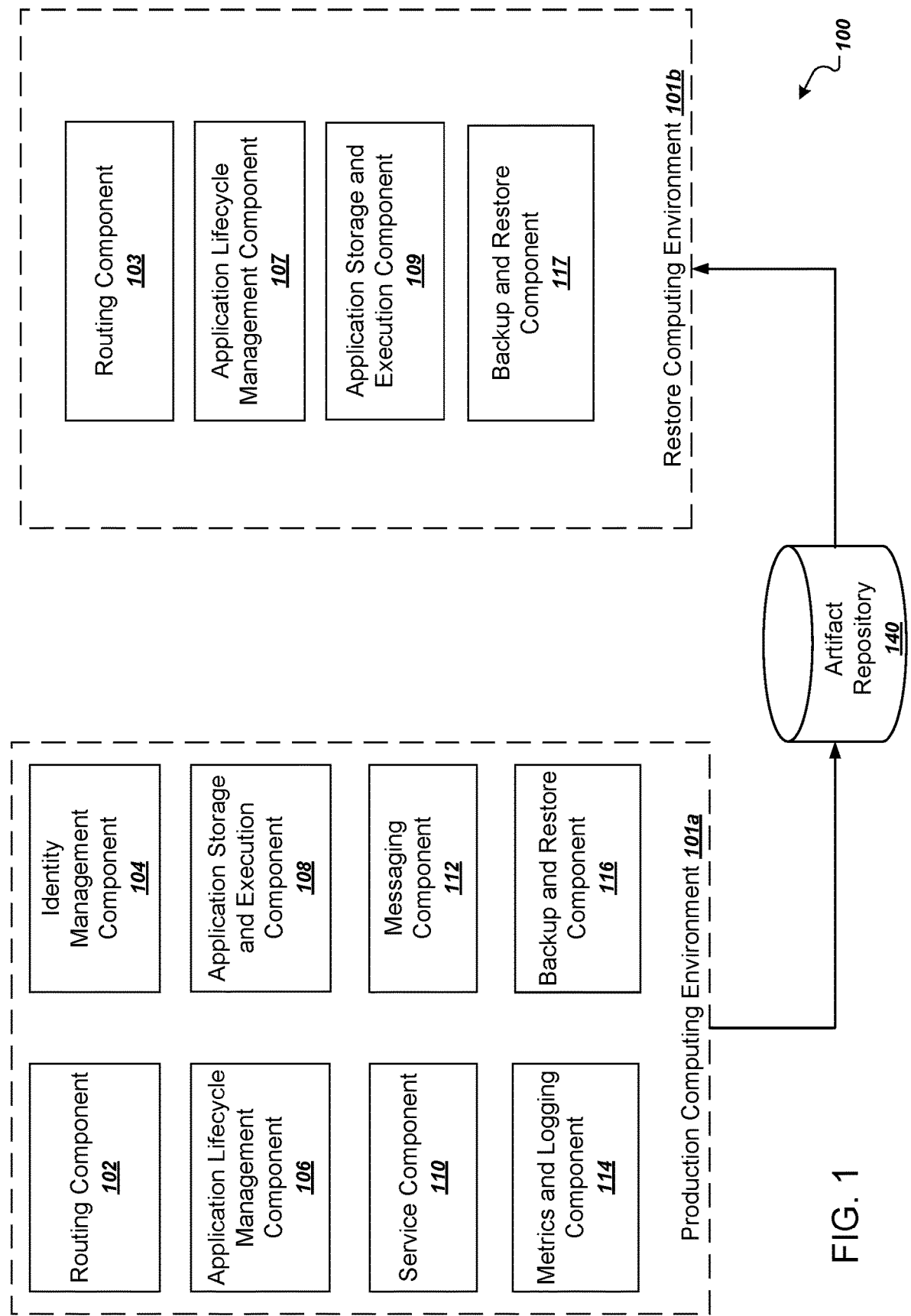
FIG. 1 is a block diagram of an example distributed computing system for implementing a backup and validation process.

FIG. 1 shows a block diagram of an example system 100. The system 100 includes a distributed computing system running in a production computing environment 101a as well as a restore system running in a restore computing environment 101b. In this example, the distributed computing system is a web application platform for deploying and managing cloud-based applications. The distributed computing system acts as a Platform-as-a-Service (PaaS) and can be hosted on top of various infrastructures. For example, the distributed computing system can be an instance of Pivotal Cloud Foundry® implemented on VMware vSphere®. The distributed computing system can include multiple operational components each performing a specialized function to deploy and manage applications. Example components of the distributed computing system can include a router component 102, an authentication component 104, an application lifecycle management component 106, an application storage and execution component 108, a services component 110, a messaging component 112, a metrics and logging component 114, and a backup and restore component 116. Example functions performed by these components include balancing processing loads, distributing application source codes to virtual machines, organizing users and workspaces, storing resources, backing up system data, etc.

Each component of the production computing environment can include one or more databases. For example, the authentication component 104 can include a MySQL database for managing user credentials. In another example, the application storage and execution component 108 can include a database for storing binary large objects (BLOB), such as build packages or application code packages. To prevent data loss due to a server crash, databases of each component in the distributed computing system 100 are periodically backed up. During the backup process, data from databases are converted into backup artifacts, which can be used to restore the backed-up databases at a later time.

The routing component 102 can route incoming traffic to the distributed computing system to the appropriate component. For example, the routing component 102 can route a request from an external user device to a corresponding hosted application running on the application storage and execution component 108. In another example, the routing component 102 can query the messaging component 112 to determine the status of an application running in the distributed computing system.

The authentication component 104 can provide identity management in the distributed computing system. For example, the authentication component 104 can include a User Account and Authentication (UAA) server to provide delegate authorization for client applications.

The application lifecycle management component 106 can direct the deployment of applications and monitor applications' states in the distributed computing system. For example, the application lifecycle management component 106 can scale an application by launching more application instances.

The application storage and execution component 108 can store and manage applications in the distributed computing system. For example, the application storage and execution component 108 can include repositories for large binary files to store persistent data such as application code packages or build packages.

The application storage and execution component 108 can also manage and execute applications on different virtual machines, including tracking application status or broadcasting state messages for each virtual machine.

The service component 110 can integrate various services with the distributed computing system. For example, services can provide reserved resources and credentials to end users on demand. The service component 110 can communicate with the application lifecycle management component 106 using application programming interfaces (APIs). The service component 110 can provision, bind, unbind, and delete a plurality of services to applications running in the distributed computing system.

The messaging component 112 can allow virtual machines running in the distributed computing system to communicate with each other through HTTP or HTTPS protocols.

The metrics and logging component 114 can gather and stream application logs in the distributed computing system. For example, an operator can examine application logs using a command line interface, and can stream the logs to a third-party log analysis service.

The backup and restore component 116 can cause the system 100 to generate backup artifacts for one or more components in the production computing environment 101a. For example, the backup and restore component 116 can execute at a predefined time to initiate the backup process. In another example, the backup and restore component 116 can receive a backup request from an operator of the system 100.

During a backup process, backup artifacts corresponding to data stored in each of the components in the system 100 can be transferred and stored in an artifact repository 140. The artifact repository 140 can be an external storage system, a part of the production computing environment 101a, or a part of the restore computing environment 101b.

The restore computing environment 101b can be a scaled-down distributed computing system having fewer allocated resources than the production computing environment 101a. For example, the restore computing environment 101b may lack networking or Internet access. In addition, the restore computing environment 101b can have fewer operational components that the full, production computing environment 101a. In other words, the restore computing environment 101b may have one or more components removed compared to the production computing environment 101a. For example, the restore computing environment 101b can include a routing component 103, an application lifecycle management component 107, an application storage and execution component 109, and a backup and restore component 117, but lacks an identity management component 104, a service component 110, a messaging component 112, and a metrics and logging component 114.

The restore computing environment 101b can serve as a test environment to restore and verify backup artifacts in a more efficient manner. For example, the backup and restore component 117 can access backup artifacts stored in the artifact repository 140 to set up the restore and computing environment 101b. The backup and restore component 117 can then instruct each component in the restore computing environment 101b to execute a verification script that determines whether or not the restored component has properties that match the verification data stored in the backup artifacts.

The backup and restore component 117 can determine whether or not the restore was sufficiently successful depending on the results of the verification scripts. Not all verifications need to be completely successful in order for the restore to be considered successful. In addition, the backup and restore component 117 can take different automatic actions depending on the results of the verification scripts. For example, if a sufficient number of verification scripts or their individual results succeeded, the backup and restore component 117 can simply generate a notification that is sent to a user or logged and which indicates that the restore process was successfully verified.

On the other hand, if an insufficient number of verify scripts or individual results succeeded, the backup and restore component 117 can take additional automatic actions. For example, the backup and restore component 117 can orchestrate the generation of another backup, e.g., by directing its counterpart backup and restore component 116 on the production computing environment to restart the backup process. If the verification failures were severe enough, the backup and restore component 117 can escalate the information by sending and logging an indication that the backup process is not adequately functioning and that the operators of the system need to perform a manual inspection of the backup and restore processes.

Figure 2:
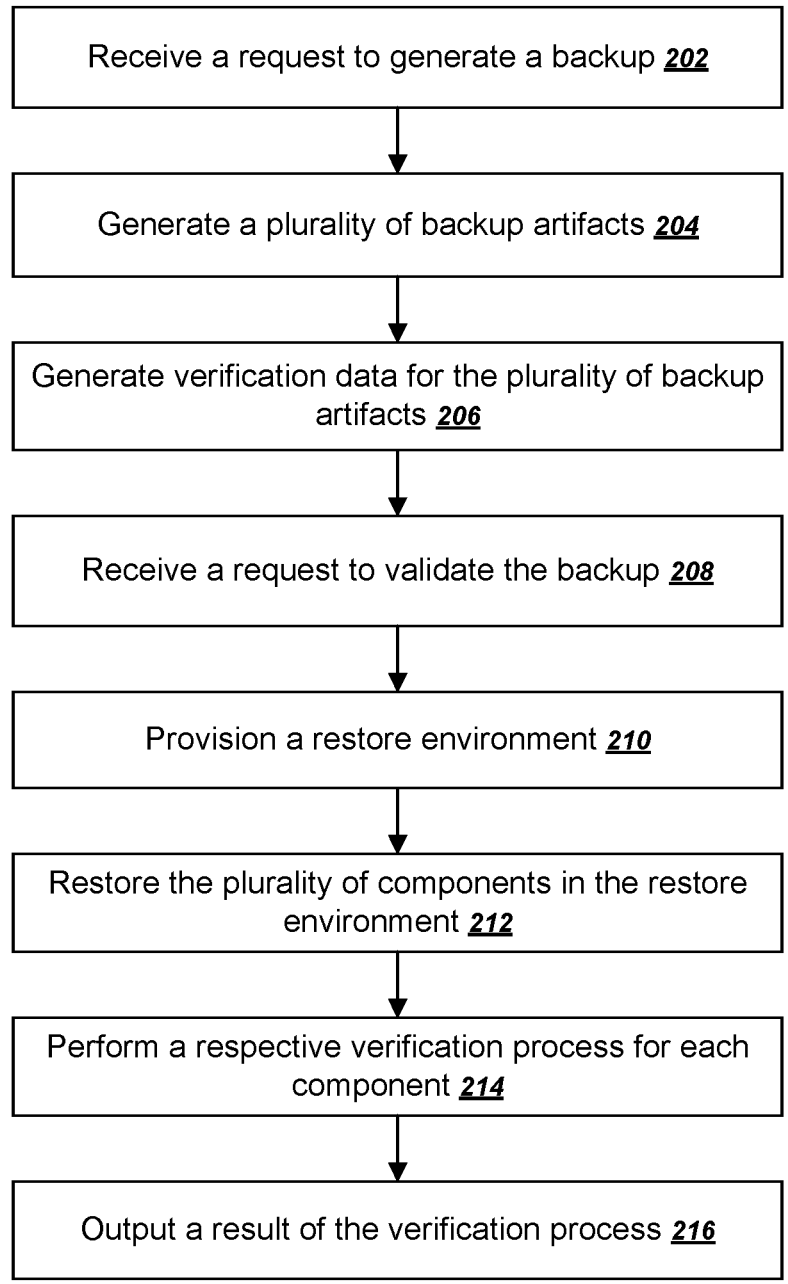
FIG. 2 is a flow chart of an example process for validating backup artifacts for a distributed computing system.

FIG. 2 is a flow chart of an example process for validating backup artifacts for a distributed computing system. For convenience, the process will be described as being performed by a system of one or more computers, located in one or more locations, and programmed appropriately in accordance with this specification. For example, a web application platform, e.g., the production computing environment 101a of FIG. 1, appropriately programmed, can perform the example process.

The system receives a request to generate a backup for one or more components of the distributed computing system (202). For example, a backup and restore component can initiate the request by executing a predefined backup script in a production computing environment that specifies which components to be backed up.

In response to the backup request, the distributed computing system can enter a pre-backup-lock mode. In the pre-backup-lock mode, some components of the production computing environment pause functioning and no longer receive outside communications or respond to API calls. Some other components enter into read-only mode and can provide raw data in response to queries and generate backup metadata, but not change their state or internal data until the backup process is completed.

The system generates a plurality of backup artifacts from data of the one or more components (204). Each operational component of the system can generate backup artifacts that store data of the component, e.g., static and runtime files, database contents, and configuration settings, to name just a few examples. The system can then store the backup artifacts in a secured location, e.g., the artifact repository 140.

The system generates verification data for the plurality of backup artifacts (206). The verification data is data that can be used to verify the contents of a backup artifact from an operational component after being restored from the backup artifact. Thus, verification data can include metadata about data produced in the backup process.

In general, each operational component can generate its own verification data to verify the contents of backup artifacts generated by that operational component. However, in some implementations, some components can generate verification data that relates to two or more operational components. For example, if two operational components have frequent communications or have tightly coupled states, one of the operational components can generate verification data that can be used to verify backup artifacts generated by the other operational component.

The system can use any appropriate type of metadata to generate the verification data. For example, the verification data can include values of various properties of data stored by the component, e.g., a count of data entries, rows, columns, or tables in a component database to name just a few examples.

In another example, the metadata can indicate the types of data in a component database, and the system can cross-reference the types of data in a restored component database with those in the metadata during validation. In another example, the metadata includes data structural relationship in a component database, and the system can compare the data relationship in a restored component database with that included in the metadata.

The system can store the generated metadata along with or as part of the backup artifacts stored in an artifact repository, e.g., the artifact repository 140. In some implementations, each component of the production computing environment 101a can provide its own verification script and its own set of backup verification data.

In some implementations, the amount of metadata needed for verification depends on the size of the backed-up databases. If the system attempts to back up a component with a large database, more metadata is needed to produce a reliable verification result. In some cases, the metadata can include sensitive information. Therefore, the system can encrypt the metadata in order to improve system security.

The system receives a request to verify the backup artifacts (208). For example, an operator can provide the verification request to a backup and restore component of a production system. Alternatively or in addition, the system can automatically attempt to validate each backup after it is generated. To do so, a backup script can include an additional verification step.

In response to the verification request, the system performs a verification process. As part of this process, the backup and restore component can provision a restore environment and restore one or more operational components from their respective backup artifacts. The provisions a restore environment (210). The restore environment can be a scaled-down distributed computing system, e.g., the restore computing environment 101b of FIG. 1. In some examples, the operator can specify which components to be included in the restore environment. In another example, the system has preset scaled-down environments that can be used as the restore computing environment 101b. For example, Pivotal Cloud Foundry has a Small Footprint Pivotal Application Service with eight VMs that can act as a restore computing environment.

The system restores the plurality of components in the restore environment (212). For example, the system rehydrates databases in the restore environment with the backup artifacts.

The system performs a respective verification process for each component to verify the contents of the restored component using the verification data for the component (214). Each component can provide its own verification script and perform the verification script against its own verification data.

The system can then compare the metadata with the corresponding restored data to determine whether or not the backup artifact is valid. If the metadata matches the restored data in the corresponding components, the system can record an indication that the backup artifact for the component is verified.

The system outputs a result of the verification process (216). As described above, the system can take different automatic actions depending on the results of the individual verification scripts. For example, the system can count the number of scripts or verification tests that succeeded or failed and compare the result to a threshold in order to determine whether or not the verification process was a full success, a partial success, or a failure.

Figure 3:
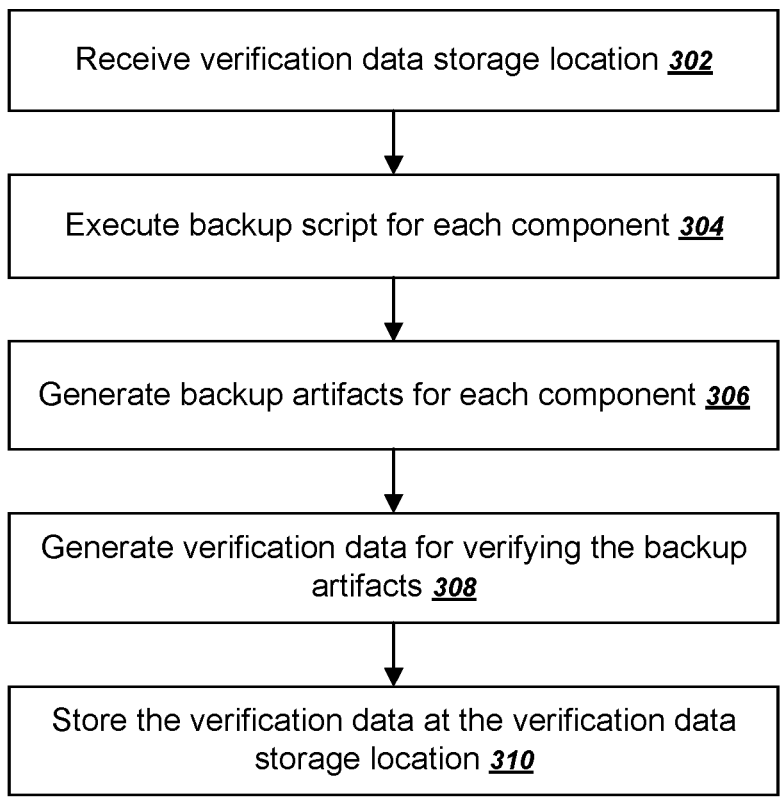
FIG. 3 is a flow chart of an example backup process performed in a distributed computing system.

FIG. 3 is a flow chart of an example backup process performed in a distributed computing system. The backup process backs up data in one or more databases of one or more components, and can be initiated when an operator executes a backup script in the production computing environment 101a.

The system receives a verification data storage location (302). For example, the operator who initiates the backup process can designate a location in the system or an external location to store the verification data. The operator can input the verification data storage location as a parameter to the backup script, and the verification data storage location can be the same or different from the backed-up data storage location, e.g., the artifacts repository 140.

The system executes a backup script for each component (304). The backup script can account for different databases used in each component. For example, some components may store data using MySQL while others using Postgres.

The system generates backup artifacts from component data (306). For example, the backup artifacts can include data extracted from databases for each component in the distributed computing system.

The system generates custom verification data for verifying the backup artifacts (308). Verification data can include metadata describing the backed-up data in the databases for each component in the system. The amount of metadata needed for a reliable verification depends on the size of the databases.

The system stores the verification data at the verification data storage location (310). The verification data, e.g., metadata, can be accessed by the system during a verification process. In some examples, the verification data can include sensitive information such as user credential of the system, and need to be encrypted before transferring to the verification data storage location.

Figure 4:
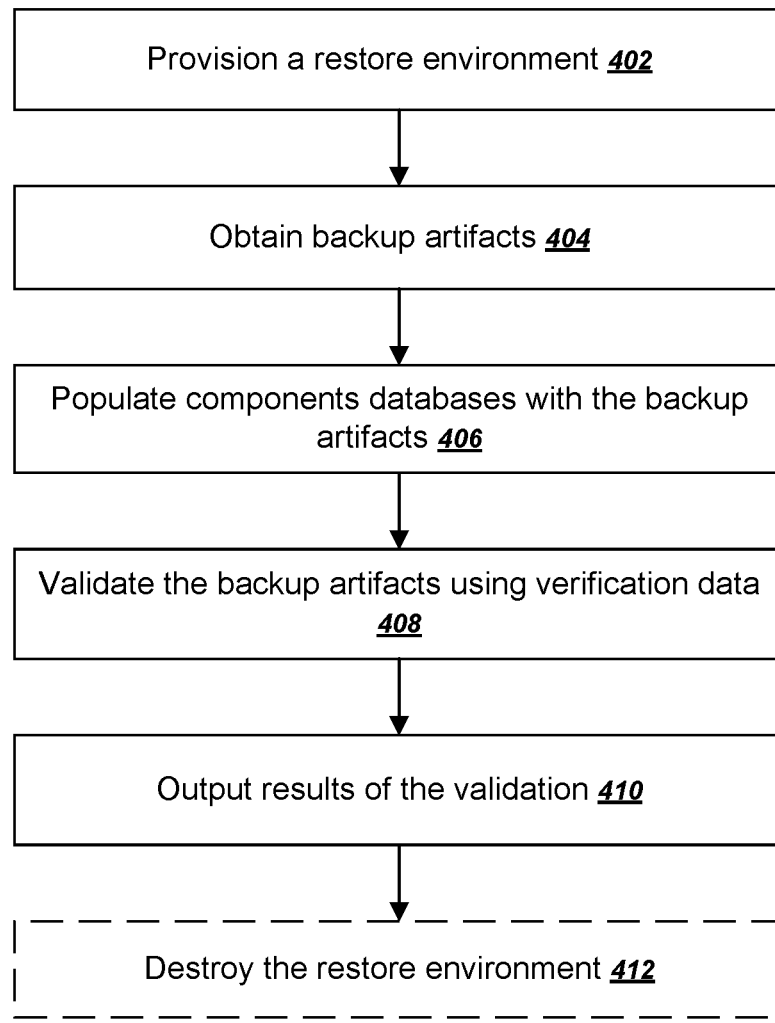
FIG. 4 is a flow chart of an example validation process performed in a distributed computing system.

FIG. 4 is a flow chart of an example verification process performed in a distributed computing system. The verification process validates the integrity of backup artifacts generated during the backup process in FIG. 3. The verification process can be initiated in response to an operator executing a verification script in the system, and can start automatically after a backup process completes.

The system provisions a restore environment (402). For example, the restore environment can be a replication of the production computing environment 101a with all components. As a result, the verification in this restore environment will involve a full restore and is expensive to implement. In another example, the restore environment can include only some of the components in the production computing environment 101a. An example of such restore environment is the restore computing environment 101b of FIG. 1.

The system obtains backup artifacts (404). For example, the backup artifacts can be stored in the system or in an external storage medium. In some examples, the location of the backup artifacts is specified by the operator as a parameter when executing the verification script.

The system populates components in the restore environment with backup artifacts (406). For example, the system rehydrates the empty databases for each component in the restore environment with data from the backup artifacts.

The system validates the backup artifacts using stored verification data (408). For example, the verification data can be metadata of backup artifacts generated during the backup process. Each component of the production computing environment 101a can provide its own verification script and verification data.

The system can validate the backup artifacts by comparing metadata with corresponding restored data in the restored environment. For example, if the verification data recorded the number of rows in a database, the system can count the number of rows in the restored database and determine if it matches the value in the verification data. As another example, the system can determine what kinds of datatypes are stored by the restored operational component and determine whether or not those types match the values in the verification data.

The system outputs results of the validation (410). As described above, the system can take a number of automatic actions depending on a result of the verification process. The system can record an indication of success or failure in a log, direct the production system to perform another backup, e.g., in the case of a failure, or generate a notification to an operator that the backup process needs to be inspected, to name just a few examples.

The system optionally destroys the restore environment (412). As an optional step and to conserve memory in the distributed computing system, the system can destroy the restore environment when the verification process terminates. Alternatively, the system can maintain the provisioned restore environment for use in the next validation process.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In addition to the embodiments described above, the following embodiments are also innovative:

Embodiment 1 is a computer-implemented method comprising: receiving, by a distributed computing system comprising a plurality of components, each component configured to perform a different function in the distributed computing system, a request to generate a backup of the distributed computing system, the backup comprising a plurality of backup artifacts generated by respective components of the distributed computing system; generating, by each of the plurality of components of the distributed computing system, one or more backup artifacts; generating, by each of the plurality of components of the distributed computing system, verification data, the verification data being metadata about the contents of the generated backup artifacts; obtaining, by the distributed computing system, a second request to validate the backup; provisioning a restore environment; processing the plurality of backup artifacts to restore the plurality of components in the provisioned restore environment; performing, by each restored component of the plurality of components in the restore environment, a respective verification process using respective verification data for the restored component, wherein each verification process determines whether contents of the restored component matches the respective verification data for the restored component; and outputting a result of the verification processes.

Embodiment 2 is the computer-implemented method of embodiment 1, wherein the restore environment is a scaled-down version of the first computing environment.

Embodiment 3 is the computer-implemented method of any one of embodiments 1 to 2, wherein the distributed computing system is a distributed cloud application platform having one or more computer engines that host user-provided applications.

Embodiment 4 is the computer-implemented method of any one of embodiments 1 to 3, wherein the components include two or more of: a health checker component; a router component; an authorization system; a credential system; a release manager; a storage component; a messaging component; a cloud controller; and a compute engine.

Embodiment 5 is the computer-implemented method of any one of embodiments 1 to 4, wherein the metadata are encrypted when generated by each of the plurality of components in the distributed computing system.

Embodiment 6 is the computer-implemented method of any one of embodiments 1 to 5, wherein restoring the plurality of components in the provisioned restore environment comprises rehydrating one or more databases in each of the plurality of components with corresponding backup artifacts.

Embodiment 7 is the computer-implemented method of any one of embodiments 1 to 6, further comprising deleting the restore environment if the validation is successful.

Embodiment 8 is the computer-implemented method of any one of embodiments 1 to 7, further comprising generating one or more second backup artifacts if the validation is unsuccessful.

Embodiment 9 is a system comprising: one or more computers and one or more storage devices storing instructions that are operable, when executed by the one or more computers, to cause the one or more computers to perform the method of embodiment 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by a distributed computing system comprising a plurality of components running a production environment, each component configured to perform a different function in the production environment, a request to generate a backup of the distributed computing system, the backup comprising a plurality of backup artifacts generated by respective components of the distributed computing system;
generating, by each of the plurality of components of the distributed computing system, one or more backup artifacts;
generating, by each of the plurality of components of the distributed computing system, verification data, the verification data being metadata about the contents of the backup artifacts generated in the production environment;
obtaining, by the distributed computing system, a second request to validate the backup;
in response to the second request to validate the backup, provisioning a restore environment while the plurality of components of the production environment are running, wherein provisioning the restore environment comprises launching, in the provisioned restore environment, a duplicate of one or more components of the plurality of components of the production environment;
processing the plurality of backup artifacts to populate the one or more duplicate components of the plurality of components in the provisioned restore environment;
performing, by each launched component of the plurality of components in the restore environment, a respective verification process using respective verification data for the restored component, wherein each verification process determines whether contents of the launched component matches the respective verification data generated for the components running in the production environment; and
outputting a result of the verification processes.

2. The computer-implemented method of claim 1, wherein the restore environment is a scaled-down version of the first computing environment.

3. The computer-implemented method of claim 1, wherein the distributed computing system is a distributed cloud application platform having one or more compute engines that host user-provided applications.

4. The computer-implemented method of claim 1, wherein the components include two or more of: a health checker component; a router component; an authorization system; a credential system; a release manager; a storage component; a messaging component; a cloud controller; and a compute engine.

5. The computer-implemented method of claim 1, wherein the metadata are encrypted when generated by each of the plurality of components in the distributed computing system.

6. The computer-implemented method of claim 1, wherein restoring the plurality of components in the provisioned restore environment comprises rehydrating one or more databases in each of the plurality of components with corresponding backup artifacts.

7. The computer-implemented method of claim 1, further comprising, after performing the respective verification processes,
deleting the restore environment if the validation is successful.

8. The computer-implemented method of claim 1, further comprising generating one or more second backup artifacts if the validation is unsuccessful.

9. A system comprising one or more computers and one or more storage devices storing instructions that when executed by the one or more computers cause the one or more computers to perform operations comprising:
- receiving, by a distributed computing system comprising a plurality of components running a production environment, each component configured to perform a different function in the production environment, a request to generate a backup of the distributed computing system, the backup comprising a plurality of backup artifacts generated by respective components of the distributed computing system;
- generating, by each of the plurality of components of the distributed computing system, one or more backup artifacts;
- generating, by each of the plurality of components of the distributed computing system, verification data, the verification data being metadata about the contents of the backup artifacts generated in the production environment;
- obtaining, by the distributed computing system, a second request to validate the backup;
- in response to the second request to validate the backup, provisioning a restore environment while the plurality of components of the production environment are running, wherein provisioning the restore environment comprises launching, in the provisioned restore environment, a duplicate of one or more components of the plurality of components of the production environment;
- processing the plurality of backup artifacts to populate the one or more duplicate components of the plurality of components in the provisioned restore environment;
- performing, by each launched component of the plurality of components in the restore environment, a respective verification process using respective verification data for the restored component, wherein each verification process determines whether contents of the launched component matches the respective verification data generated for the components running in the production environment; and
- outputting a result of the verification processes.

10. The system of claim 9, wherein the restore environment is a scaled-down version of the first computing environment.

11. The system of claim 10, wherein the distributed computing system is a distributed cloud application platform having one or more compute engines that host user-provided applications.

12. The system of claim 11, wherein the components include two or more of: a health checker component; a router component; an authorization system; a credential system; a release manager; a storage component; a messaging component; a cloud controller; and a compute engine.

13. The system of claim 12, wherein the metadata are encrypted when generated by each of the plurality of components in the distributed computing system.

14. The system of claim 13, wherein restoring the plurality of components in the provisioned restore environment comprises rehydrating one or more databases in each of the plurality of components with corresponding backup artifacts.

15. The system of claim 14, wherein the operations further comprise, after performing the respective verification processes:
- deleting the restore environment if the validation is successful.

16. The system of claim 15, wherein the operations further comprise generating one or more second backup artifacts if the validation is unsuccessful.

17. A non-transitory computer storage medium encoded with a computer program, the computer program storing instructions that when executed by one or more computers cause the one or more computers to perform operations comprising:
- receiving, by a distributed computing system comprising a plurality of components running a production environment, each component configured to perform a different function in the production environment, a request to generate a backup of the distributed computing system, the backup comprising a plurality of backup artifacts generated by respective components of the distributed computing system;
- generating, by each of the plurality of components of the distributed computing system, one or more backup artifacts;
- generating, by each of the plurality of components of the distributed computing system, verification data, the verification data being metadata about the contents of the backup artifacts generated in the production environment;
- obtaining, by the distributed computing system, a second request to validate the backup;
- in response to the second request to validate the backup, provisioning a restore environment while the plurality of components of the production environment are running, wherein provisioning the restore environment comprises launching, in the provisioned restore environment, a duplicate of one or more components of the plurality of components of the production environment;
- processing the plurality of backup artifacts to populate the one or more duplicate components of the plurality of components in the provisioned restore environment;
- performing, by each launched component of the plurality of components in the restore environment, a respective verification process using respective verification data for the restored component, wherein each verification process determines whether contents of the launched component matches the respective verification data generated for the components running in the production environment; and
- outputting a result of the verification processes.

18. The non-transitory computer storage medium of claim 17, wherein the restore environment is a scaled-down version of the first computing environment.

19. The non-transitory computer storage medium of claim 18, wherein the distributed computing system is a distributed cloud application platform having one or more compute engines that host user-provided applications.

20. The non-transitory computer storage medium of claim 19, wherein the components include two or more of: a health checker component; a router component; an authorization system; a credential system; a release manager; a storage component; a messaging component; a cloud controller; and a compute engine.

* * * * *